Dec. 12, 1967     D. D. WILEY     3,358,230
ELECTRONIC DEVICE
Filed March 5, 1965
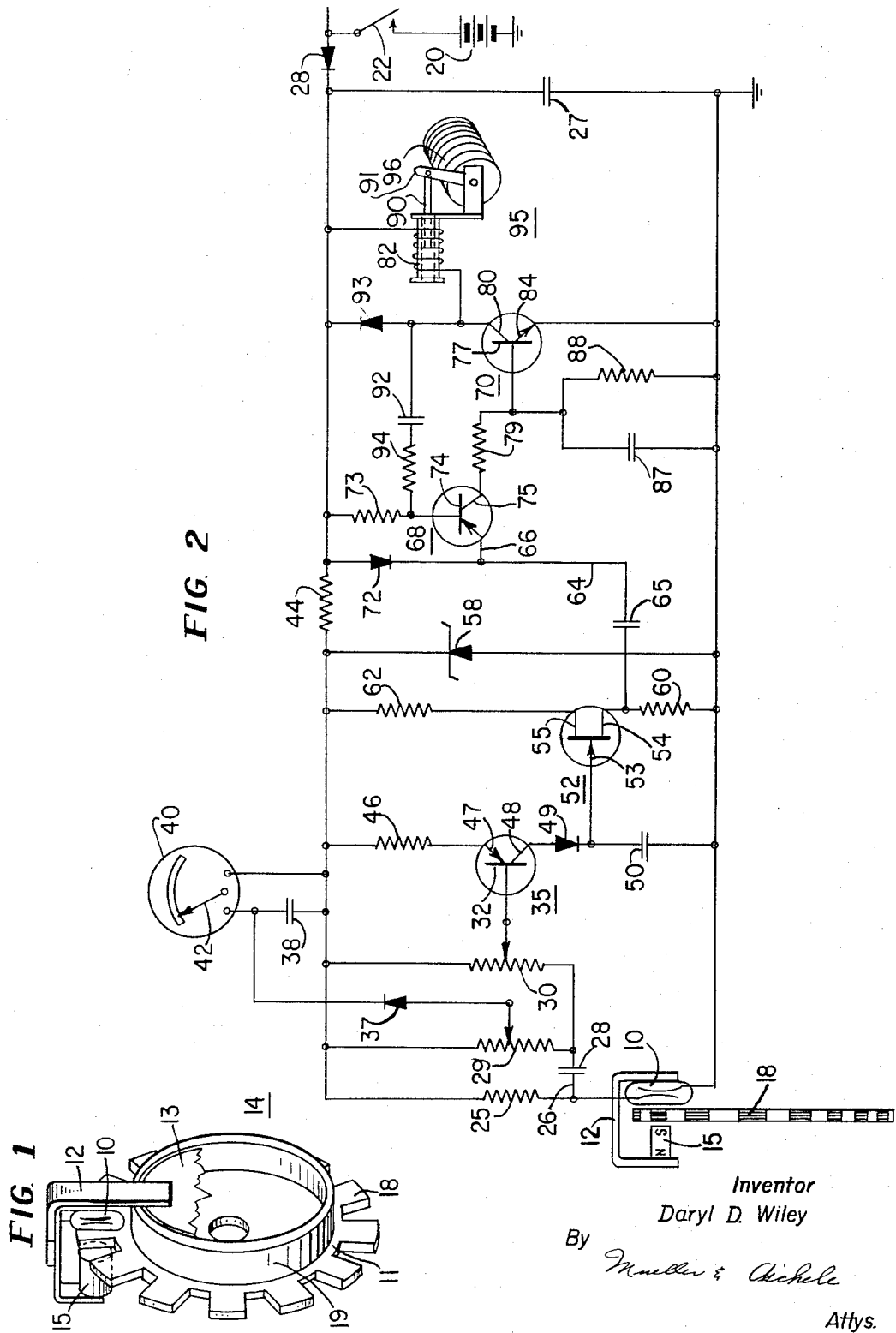
Inventor
Daryl D. Wiley
By
Mueller & Aichele
Attys.

United States Patent Office 3,358,230
Patented Dec. 12, 1967

3,358,230
ELECTRONIC DEVICE
Daryl D. Wiley, Elmhurst, Ill., assignor to Motorola, Inc., Franklin Park, Ill., a corporation of Illinois
Filed Mar. 5, 1965, Ser. No. 437,378
4 Claims. (Cl. 324—70)

ABSTRACT OF THE DISCLOSURE

This apparatus uses a pulse generator including a magnetically operated reed switch to generate pulses representing an increment of distance traveled by the vehicle. The pulses are differentiated into positive and negative-going signals. The signals of one polarity are integrated and coupled to a meter calibrated to indicate the rate of travel for the vehicle. The pulses of the other polarity are coupled from the differentiating network to a stair-step generator which triggers a relaxation oscillator to operate an electromechanical counting device for registering the total distance traveled by the vehicle.

This invention pertains generally to an electronic counting and rate indicating device, and more particularly to an electronic speedometer and odometer for a vehicle.

Speedometers and odometers presently in use in automobiles utilize mechanical drive cables for connecting a portion of the vehicle which rotates at a speed proportional to the speed of the vehicle and having the indicating and recording mechanism of the speedometer and odometer. Thus, for example, the cable may extend from the transmission or drive shaft of the vehicle, to the speedometer in the dash panel. Mechanical speedometer cables are subject to a number of difficulties such as a high frequency chatter, and difficulty of assembly and placement in the vehicle. Such cables also are especially unsatisfactory when the length of the cable is relatively long, such as in trucks and buses, because of the fact that the tortional twisting of the cable yields inaccuracy in the speedometer and odometer readings.

It has been proposed to utilize a speedometer and odometer which is electrical to thereby eliminate the lengthy mechanical cables, however, such systems have heretofore been complex and unreliable. Sufficient power to drive conventional type indicators has necessitated excessively large pickup devices. Conversely, compact pickup devices may not supply sufficient power to drive the indicator.

It is, therefore, an object of this invention to provide an improved electronic indicating and counting device.

Another object of this invention is to provide an electronic speedometer and odometer for a vehicle which does not utilize a mechanical drive cable.

Still another object of this invention is to provide an electronic speedometer and counting odometer of a construction that is compact and can be manufactured at a reasonable cost.

One feature of this invention is the provision of an electronic speedometer and odometer for a vehicle having a magnetically operated reed switch responsive to movement of the vehicle for providing electrical pulses, with each pulse representing an increment of distance traveled by the automobile and use to actuate the speedometer and/or odometer of the vehicle.

Another feature of this invention is the provision of an electronic speedometer for a vehicle having an integrating circuit cooperating with a milliammeter, the combination being responsive to the electrical pulses to translate the pulse repetition rate into an indication of the speed of the vehicle.

Still another feature of this invention is the provision of an electronic odometer for a vehicle having a stairstep generator and a relaxation oscillator responsive to a given number of electrical pulses to produce an output control signal with a mechanical counter being electrically actuated by the output control signal to count and indicate the increments of distance traveled by the vehicle.

Yet another feature of this invention is the provision of an electronic speedometer and odometer for a vehicle having a magnetically operated reed switch responsive to movement of the vehicle for providing electrical pulses representing increments of distance traveled by the vehicle, with a differentiating circuit coupling the pulses, in the form of positive and negative-going output signals to an integrating circuit and a stairstep generator. The integrating circuit in cooperation with a milliammeter translates the pulse rate into an indication of miles per hour (m.p.h.). The stairstep generator in combination with a relaxation oscillator provides a control signal in response to a given number of pulses, and a mechanical counter is electrically actuated by the control signal to count and indicate the increments of distance traveled by the vehicdle.

In the drawing:

FIG. 1 is a perspective view showing the reed switch of the invention mounted to the brake drum of a motor vehicle; and FIG. 2 is a schematic diagram showing the electric speedometer and odometer circuit.

In practicing this invention a speedometer and odometer for a vehicle is actuated by a magnetically operated reed switch coupled to a moving part of the vehicle, such as a front wheel. As the wheel rotates, the switch intermittently opens and closes producing electrical pulses, each representing an increment of distance traveled by the vehicle. The pulses are coupled to a differentiating circuit, which is responsive to the pulses to produce positive and negative-going output signals. The positive-going signal is coupled to an integrating circuit which integrates the signals with respect to time to determine the rate of travel of the vehicle. A milliammeter is used in combination with the integrating circuit to convert the integrated electrical signal into mechanical motion for visually indicating the speed of the vehicle in the form of m.p.h.

The negative-going signal from the differentiating circuit is coupled to a relaxation oscillator which includes a stairstep generator and a unijunction transistor. A charge is built up by increments on the capacitor of the stairstep generator in response to the electrical pulses until the unijunction transistor fires discharging the capacitor. The control signal from the unijunction transistor is coupled to a control amplifier which energizes an electric solenoid. The solenoid when energized operates a mechanical counter. By calibrating the relaxation oscillator to fire every 1/100 of a mile, the counter in effect translates the pulses from the magnetically operated reed switch to count and indicate in miles the distance traveled by the vehicle.

The device of this invention is described for use as a speedometer and odometer for an automobile. However, it should be understood that this device may find utility in other applications where it is desired to count the number of cycles, and indicate the repetition rate of a cyclically moving member.

In FIG. 1 the reed switch 10 is shown mounted by U-shaped bracket 12 to the fixed portion 13 of the brake drum 14, which is of the type associated with the front wheel of an automobile (not shown). Magnet 15 is mounted by the same U-shaped bracket 12 and is disposed directly facing the reed switch 10. Shutter fins 18 are mounted to the ring 11 which is fixed to the rotating portion 19 of the drum 14 and rotate with it. Bracket 12 is made of magnetic material so that a field is provided through the reed switch 10. The fins 18 are also of magnetic material. As the portion 19 rotates with the turning of the wheel, the shutter fins 18 pass between the magnet 15 and the switch 10, intermittently making the magnetic field and opening the switch. This cyclic opening and closing of the switch 10 is used to generate electrical pulses which directly reflect the motion of the vehicle.

The circuit and operation of the electric speedometer and odometer will be explained by referring to FIG. 2. The reed switch 10 is connected to the battery or power supply 20 through the ignition switch 22. The battery 20 has a filter capacitor 27 and a diode 28 which protects the system from improper polarity at the time the power supply is connected to the system. The power supply can be, for example, the 12 volt electrical system for an automobile. The system is energized by closing the ignition switch 22 so that the closing of the reed switch 10 causes a positive-going pulse from battery 20 to be coupled by resistor 25 to the input of a differentiating circuit 26 comprised of capacitor 28 series connected to two variable parallel resistors 29 and 30. Since the capacitor 28 resists any instantaneous change in potential, the capacitor 28 is discharged to ground through the switch 10 causing a negative-going pulse to be seen at the output of the differentiating circuit i.e., at resistors 29 and 30. Conversely, when the switch 10 is opened in the described manner, the capacitor 28 resists the instantaneous change in potential and capacitor 28 is charged providing a positive-going pulse at the output of the differentiating circuit.

Applying this positive-going pulse to the base 32 of PNP transistor 35 drives the transistor 35 further out of conduction. However, when the positive-going pulse appears across variable resistor 29, which in combination with blocking diode 37 and capacitor 38 forms an integrating circuit, the pulse is integrated with respect to time. The meter 40 across the capacitor 38 uses the potential on capacitor 38 to move the arm 42 of the meter in the known manner to convert the electrical potential on the capacitor into mechanical motion. The meter 40 could be a milliammeter, for example. The resistor 29 may be varied to adjust the amplitude of the positive-going output signal thereby calibrating the integrating circuit such that, if the face of the meter 40 is made to represent a speedometer dial, the charge on the capacitor for a given pulse rate i.e., speed of rotation of the wheel, will deflect the arm 42 of the meter 40 to accurately indicate the vehicle speed in m.p.h.

The negative-going pulse formed when the switch 10 is closed is blocked by diode 37 from charging capacitor 38. This negative-going pulse formed when the switch 10 is closed is blocked by diode 37 from charging capacitor 38. This negative-going pulse, however, appears across resistor 30 and is coupled by that resistor to the base 32 of PNP transistor 35 to drive that transistor into conduction. When transistor 35 conducts, current flow is through resistor 44, emitter bias resistor 46, the emitter 47, collector 48 and blocking diode 49 to charge capacitor 50. From the foregoing discussion it can be seen that the transistor 35 and capacitor 50 form a stairstep generator, with the charge on the capacitor increasing with each negative-going signal. This stairstep generator in cooperation with the unijunction transistor 52 forms a relaxation oscillator.

The unijunction transistor 52 has an emitter 53, base I 54, and base II 55. Resistor 44 and zener diode 58 are coupled across the battery potential to supply a regulated supply voltage to transistor 52. The voltage rises on capacitor 50 in the manner described until it reaches a predetermined level at which time the unijunction transistor 52 conducts to discharge capacitor 50 through resistor 60 in series with the base I 54 of the transistor 52. The resistor 62 connected in series to the base II 55 of transistor 52 determines the firing voltage of the transistor.

The unijunction transistor 52 is coupled to the input circuit 64 of the two stage transistor control amplifier through capacitor 65. The circuit 64 is connected to the emitter 66 of the PNP type transistor 68. Transistor 68 constitutes the first stage of the control amplifier and transistor 70 of the NPN type constitutes the second stage. Diode 72 and resistor 73 couple the power supply to the emitter 66 and base 74 respectively to provide bias for transistor 68. Collector 75 of transistor 68 is connected to the base 77 of transistor 70 through resistor 79. The collector 80 of transistor 70 is connected through solenoid winding 82 to the direct current power supply, and the emitter 84 thereof is connected to ground. Capacitor 87 cooperates with resistor 88 to form a filter to attenuate transients formed by changing potentials in the circuits.

In operation, when unijunction transistor 52 conducts, the potential will rise at the emitter 66 of transistor 68 forward biasing transistor 68 into conduction. The conduction of transistor 68 causes current flow through resistor 79 thereby raising the potential at the base 77 and forward biasing transistor 70 into conduction. This results in current flow through the collector 80 to energize solenoid 82, which is coupled to the output circuit 90 of the amplifier. A positive feedback network consisting of capacitor 92 and resistor 94 coupled between the collector 80 of transistor 70 and the base 74 of transistor 68 maintains the potential at the base 74 at a level lower than the potential on emitter 66, to insure that the amplifier will conduct for a sufficient period to energize the solenoid 82. A diode 93 is coupled across the solenoid 82 to suppress conductive transient current from transistor 70.

As previously stated, conduction of the control amplifier excites solenoid 82. Since plunger 90 of the solenoid 82 is directly connected to the actuating arm 91 of the counter 95, the excitation of the solenoid 82 actuates counter 95, which may be any counter adapted to count oscillating motion, as, for example, a counter as described in Patent No. 323,382, issued July 28, 1885.

The counter records the increments of distance traveled by the vehicle in the following manner. By properly adjusting variable resistor 30 and selecting a proper value for resistor 46, a charge may be built up on the capacitor of the stairstep generator to fire the unijunction transistor 52 every 52.8 feet or 1/100 of a mile. This, in effect, means that the unijunction transistor 52 will fire at a submultiple rate of the incoming pulse rate from the reed switch 10. Each time the transistor 52 fires the control amplifier is rendered conducting which excites the solenoid 82 as described. Each pulse through the solenoid moves the first counter wheel of counter wheels 96 (1/100 mile wheel) up one number. Ten pulses or one rotation of the first counter wheel which will be 1/10 of a mile will turn the second counter of wheels 96 (the 1/10 mile wheel) up one number. The operation will continue up to the limit of any suitable counter that may be used.

What has been described, therefore, is an improved, practical and compact electronic speedometer and odometer for a vehicle which does not utilize a mechanical drive cable.

I claim:

1. An electric odometer for a vehicle including in combination, pulsing means responsive to the movement of the vehicle for providing electrical pulses, each of said pulses representing an increment of distance traveled by the vehicle, a differentiating circuit having an input coupled to said pulsing means and an output, said differentiating circuit being responsive to said pulses to provide negative and positive-going output signals, a stairstep voltage generator including a transistor coupled to said output of said differentiating circuit, a unijunction transistor coupled to and being periodically turned on by said stairstep voltage generator in response to a given number of pulses of one polarity from said differentiating circuit, a transistor control amplifier having first and second stages and input and output circuits, means coupling said unijunction transistor to said input circuit of said amplifier, said amplifier means including capacitor means coupling said second stage of said amplifier to said first stage thereof to provide positive feedback, said control amplifier being rendered conducting by periodic signal applied thereto by said unijunction transistor, said periodic signal varying sub-multiply as said pulses from said pulsing means, counter means including an actuating electric solenoid coupled to said output circuit of said amplifier, said counter means including mechanical elements actuated by excitation of said solenoid during said periodic conduction of said control amplifier to count the increments and indicate the distance traveled by the automobile.

2. An electric speedometer and odometer for an automobile including in combination, pulsing means responsive to the movement of the automobile for providing electrical pulses, each of said pulses representing an increment of distance traveled by the automobile, a differentiating circuit having an input coupled to said pulsing means and an output, said differentiating circuit being responsive to said pulses to provide positive and negative-going output signals, an integrating circuit and a stairstep voltage generator including a transistor coupled to said output of said differentiating circuit, a milliammeter coupled to said integrating circuit, said integrating circuit being responsive to output signals one polarity from said differentiating circuit to integrate said signals with respect to time to apply a signal to said milliammeter for indicating the rate of travel of the automobile, a unijunction transistor coupled to and being periodically turned on by said stairstep voltage generator in response to a given number of signals of the other polarity from said differentiating circuit, a transistor control amplifier having first and second stages and input and output circuits, means coupling said unijunction transistor to said input circuit of said amplifier, said amplifier means including capacitor means coupling said second stage of said amplifier to said first stage thereof to provide positive feedback, said control amplifier being rendered conducting by periodic signals applied thereto by said unijunction transistor, said periodic signals varying sub-multiply as said pulses from said pulsing means, counter means including an actuatig electric solenoid coupled to said output circuit of said amplifier, said counter means including mechanical elements actuated by excitation of said solenoid during said periodic conduction of said control amplifier to count the increments and indicate the distance traveled by the automobile.

3. An electric speedometer and odometer for a vehicle, including in combination, pulsing means responsive to the movement of the vehicle for providing electrical pulses, each of said pulses representing an increment of distance traveled by the vehicle, a differentiating circuit having an input coupled to said pulsing means and an output, said differentiating circuit being responsive to said pulses to provide positive and negative-going output signals, an integrating circuit and stairstep voltage generator means coupled to the output of said differentiating circuit, meter means coupled to said integrating circuit, said integrating circuit being responsive to output signals of one polarity from said differentiating circuit to integrate said signals with respect to time to apply a signal to said meter means for operating the same to indicate the rate of travel of the vehicle, semiconductor trigger means connected to said stairstep voltage generator means, and electromechanical counter means coupled to said semiconductor trigger means, said stairstep voltage generator means being incrementally charged to a potential level by periodic signals of the other polarity being applied thereto from said differentiating circuit to operate the semiconductor trigger means after said potential level is attained to actuate said electromechanical counted means to register the distance traveled by the automobile.

4. The electric speedometer and odometer of claim 3 wherein said pulsing means includes a magnetically operated reed switch responsive to the movement of the vehicle for providing electrical pulses representing an increment of distance traveled by the vehicle.

References Cited
UNITED STATES PATENTS

| | | | |
|---|---|---|---|
| 2,221,591 | 11/1940 | Lansdale | 324—78 |
| 2,333,210 | 11/1943 | Stern | 324—70 |
| 2,873,388 | 2/1959 | Trumbo | 324—70 |
| 3,111,591 | 11/1963 | Conron | 324—78 |
| 3,210,658 | 10/1965 | Stevens | 324—70 |

FOREIGN PATENTS 961,244  6/1964  Great Britain.

RUDOLPH V. ROLINEC, *Primary Examiner.*

WALTER L. CARLSON, *Examiner.*

M. J. LYNCH, *Assistant Examiner.*